United States Patent [19]

Slawinski

[11] Patent Number: 4,977,857

[45] Date of Patent: Dec. 18, 1990

[54] PET CARRIER BAG

[76] Inventor: Nora Slawinski, 1800 N. Stanton, Apt. 605, El Paso, Tex. 79902

[21] Appl. No.: 301,127

[22] Filed: Jan. 25, 1989

Related U.S. Application Data

[63] Continuation-in-part of Ser. No. 93,272, Sep. 15, 1987.

[51] Int. Cl.[5] .................... A01K 13/00; A01K 29/00
[52] U.S. Cl. .................................................. 119/19
[58] Field of Search .................. 119/19, 143, 158, 1

[56] References Cited

U.S. PATENT DOCUMENTS

| | | |
|---|---|---|
| D. 289,806 | 5/1987 | Hadaway . |
| D. 290,176 | 6/1987 | Demeuse . |
| 2,170,379 | 8/1939 | Ortt .................................... 119/19 |
| 2,969,767 | 1/1961 | Bassett .................................. 119/1 |
| 3,150,640 | 9/1964 | Nevitt ................................. 119/96 |
| 3,547,079 | 12/1970 | Bassett .................................. 119/1 |
| 3,850,144 | 11/1974 | Springer et al. ........................ 119/19 |
| 4,010,880 | 3/1977 | Guillot-Munoz ................... 119/1 X |
| 4,763,606 | 8/1988 | Ondrasik, II ...................... 119/19 X |

FOREIGN PATENT DOCUMENTS

| | | | |
|---|---|---|---|
| 2321840 | 4/1977 | France ................................. 119/19 |
| 2476461 | 8/1981 | France ................................. 119/19 |

*Primary Examiner*—Robert P. Swiatek
*Attorney, Agent, or Firm*—Cushman, Darby & Cushman

[57] ABSTRACT

A pet carrier for enabling pets to accompany their owners on long walks and hikes including a flexible bag-like body with a slit defined along the upper surface of the bag a forward cut-out portion and extending rearwardly from a cut-out portion. A small animal may be enclosed within the bag-like body with its head disposed adjacent the cut-out portion when the slit is closed. A meshed snout portion is releasably mounted to the cut-out portion for retaining the pet within the carrier. Further, wheels or a wheeled base can be mounted to the bottom surface of the carrier so that the carrier can be pulled on the wheels rather than carried with the carrying straps. Finally, a rain hood type shield is coupled to the bag-like body so as to extend forwardly over the cut-out portion.

16 Claims, 2 Drawing Sheets

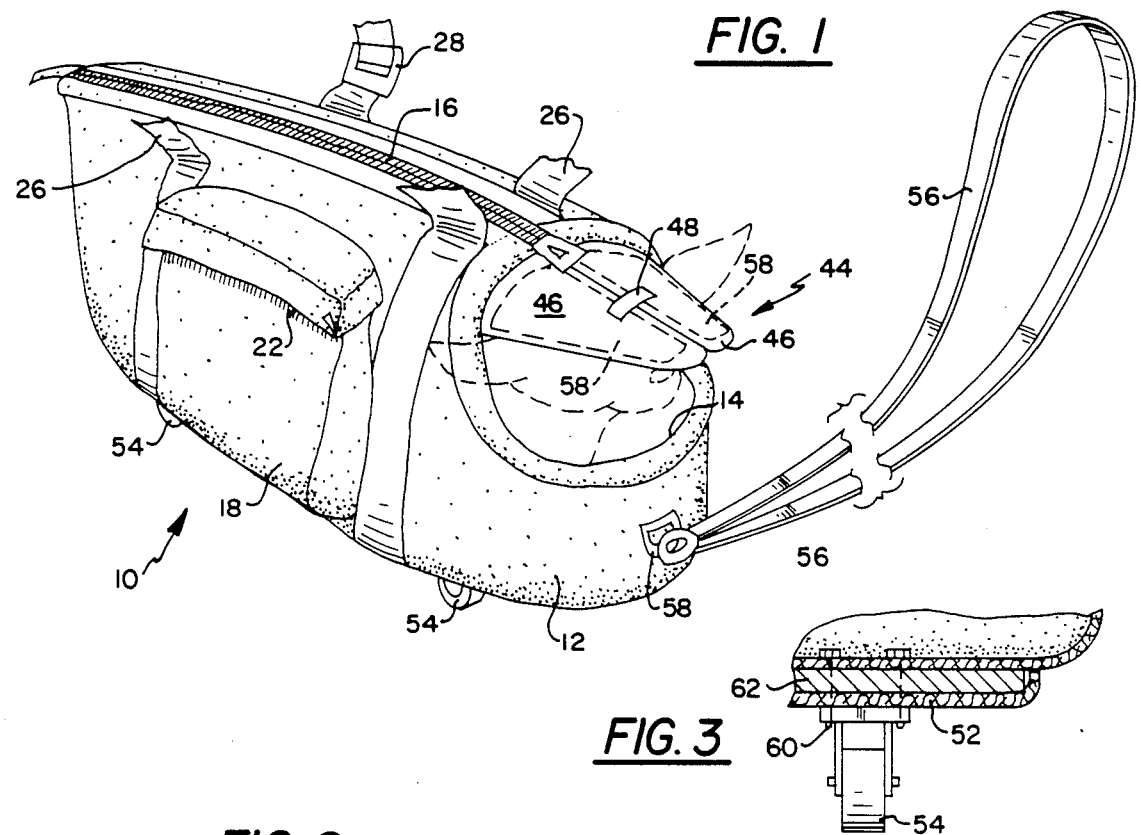
FIG. 1
FIG. 3
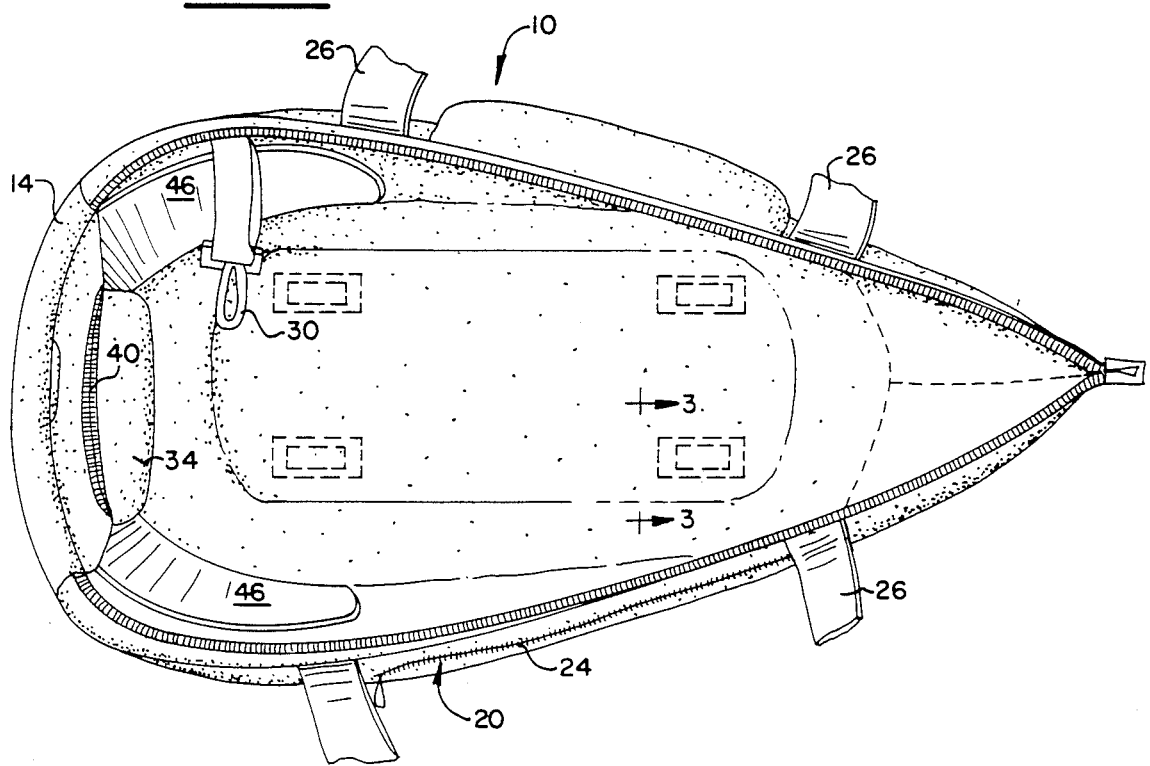
FIG. 2

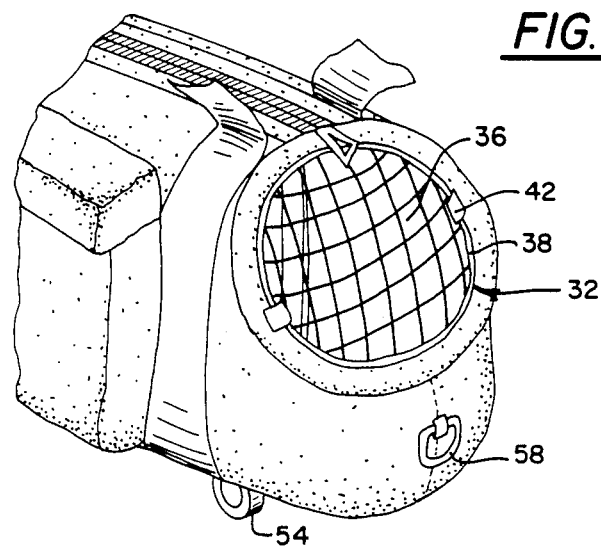
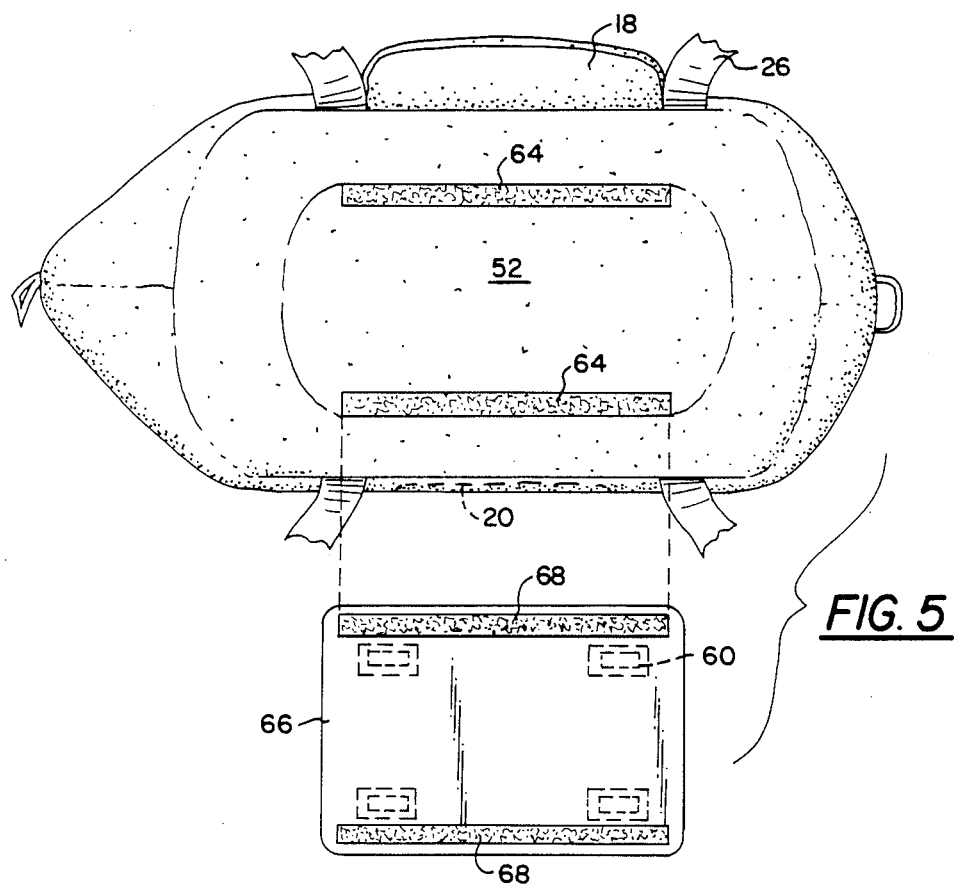

PET CARRIER BAG

This application is a continuation-in-part of my earlier application Ser. No. 07/093,272 filed Sept. 15, 1987.

1. Field of the Invention

The present invention relates to a pet carrier for carrying a small pet such as a cat or a dog. More particularly, the present invention relates to a pet carrier in which a small animal may be comfortably restrained, is easy to carry and protects the animal against inclement weather conditions.

2. Description of the Prior Art

A problem that frequently confronts the owners of pets such as cats and small dogs is that the pet frequently tires before its owner when they go on a long walk or hike. In addition, many cats and small dogs are physically incapable of traversing as rough a terrain as a human hiker and cannot walk across small creeks or streams. As a result, pet owners in the past have been prevented from taking their cats and small dogs with them on vacations or weekend hikes. This results in high kennel costs and separation of the pet from its owner.

In the alternative, pet owners have relied upon various pet carriers to enable their cats and/or dogs to travel along with them. Some of these pet carriers have been rigid and thus awkward to carry as well as uncomfortable for the pet.

Other pet carriers are flexible. However, flexible carriers have the disadvantage that they are not free standing and thus it is difficult to place the animal therewithin. Furthermore, with flexible carriers it is difficult to restrain the animal from undesired movement while providing adequate ventilation. Indeed, if the carrier is open enough to provide adequate ventilation then there is a risk that the animal will escape or, if agitated or nervous may bite the pet owner or a passerby.

Another problem encountered with prior art pet carriers which are flexible while open enough to allow adequate ventilation is that no protection against inclement weather is provided. Accordingly, such pet carriers have been unusable in bad weather conditions or, if used under such conditions, can result in small pets contracting illness and the like while being transported.

Furthermore, heretofore pet carriers have included a rigid handle or a flexible shoulder strap for transport of the same. However, while on long walks or hikes such a carrier can lead to the discomfort of the pet owner. It would therefore be desirable to provide a pet carrier which need not be continually carried by the pet owner.

Therefore, there has existed a long felt need for a device which will enable pets to accompany their owners on long walks, hikes, and in cabin during air travel, is comfortable for the animal, provides adequate ventilation while securely retaining the animal therewithin and protecting the owner and passersby from biting, shields the pet from inclement weather conditions, and need not be continually carried.

SUMMARY OF THE INVENTION

It is therefore an object of the present invention to provide a pet carrier device which will allow small pets such as cats and dogs to be transported with their owners and which has the above identified advantageous characteristics.

The foregoing object is realized in accordance with the present invention by providing a portable pet carrier for carrying small pets including a sponge rubber padded free standing bag-like body having an inner surface, an outer surface, and a cut-out portion defined at a forward end thereof. The bag-like body further includes a slit defined along the upper surface thereof extending rearwardly from the cut-out portion and having a fastening device for closing the slit so that a small animal may be closed within the bag-like body with its head disposed adjacent the cut-out portion when the slit is closed. Further, a meshed snout portion is releasably mounted to the inside cut-out portion for retaining the pet within the carrier and protecting the owner and passersby from nips should the animal become excited or nervous.

An adjustable carrying strap may be provided on the bag-like body on each side of the slit so that the pet may be carried about in a manner that is comfortable for both the pet and the owner. Additionally or in the alternative, a wheeled base and pull strap can be provided so that the pet carrier can be pulled rather than carried.

Finally, a rain hood type shield can be provided to extend over the cut-out portion of the bag-like body to protect the pet from inclement weather.

Other objects, features and characteristics of the present invention, as well as the methods of operation and functions of the related elements of the structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 1 is a perspective view of a portable pet carrier formed in accordance with the present invention with a pet disposed therewithin;

FIG. 2 is a top plan view of the carrier of the invention;

FIG. 3 is a view along line 3—3 of FIG. 2 showing one embodiment of a wheel base provided in accordance with the invention;

FIG. 4 is a prospective view showing the pet carrier of FIG. 1 without a pet therewithin, with the meshed snout portion in place and with the rain shield stored; and FIG. 5 is a bottom plan view of a second embodiment of the wheel based provided in accordance with the invention.

DETAILED DESCRIPTION OF THE PRESENTLY PREFERRED EXEMPLARY EMBODIMENT

Referring to FIGS. 1 and 5, in particular, a portable pet carrier generally designated as 10 is provided having a sponge rubber padded free standing bag-like body 12, a cut-out portion 14 provided at a forward end of the bag-like body 12 and a slit-like opening defined along the upper surface of the bag-like body, extending rearwardly from the cut-out portion 14. The outside of the bag-like body 12 is preferably formed from a machine washable fabric such as nylon or dacron. Furthermore, to ensure adequate structural support, a rigid insert can be placed within the material of the bag-like body at the base thereof so as to provide a support surface for a pet disposed therewithin. In the alternative, or additionally, a reinforcing member, preferably wrapped with a padded material can be inserted within the bag-like body to define a floor for the carrier. The reinforcing member can also provide a solid base for a permanent wheel attachment, as described more fully below.

As mentioned above, a slit-like opening is defined along the upper surface of the bag-like body 12. A slide fastener 16 is preferably provided for opening and closing the slit as illustrated. It is to be appreciated, however, that fasteners other than slide fasteners such as hooks, snaps, or Velcro-type fasteners could be provided without departing from this invention.

In order to store accessories such as a spare collar, a leash or the like, a closable pocket 18 is provided on one side of the bag-like body. In the alternative or additionally, a small pocket 20 can be provided within the wall of the bag for storing smaller articles. In the illustrated embodiments, slide fasteners 22, 24 are respectively provided for opening and closing the side pockets 18, 20 of the carrier. Again, however, it is to be understood that hooks, snaps or Velcro-type fasteners could be used without departing from this invention.

Strap handles 26 are fixedly connected on both sides of the bag-like body 12 and may be made adjustable by means of adjustable strap fasteners shown generally at 28, such as buckles or slide fasteners which are generally well known in the carrying strap art. In this way, the length of the strap handles 26 may be adjusted for the comfort of the individual pet owner.

In order to prevent the pet from falling out of the bag or jumping from same and becoming lost, a metal collar hook or fastener 30 is preferably mounted within the carrier bag 10 and can be secured to the pet's collar.

Additionally or in the alternative, a meshed snout portion 32 is provided. More particularly, the cut-out portion 14 of the bag-like body 12 includes a pocket in the material thereof designated generally as 34 and illustrated most clearly in drawing FIG. 2. A meshed snout portion 32 including a flexible mesh 36 and a relatively rigid frame portion 38 is slidably disposed within the front pocket 34 and a slide fastener 40 or the like is provided for closing the pocket 34 when the mesh portion 32 is stored therewithin. If desired, the meshed snout portion 32 is pulled from the storage pocket 34 and mounted about the periphery thereof to the peripheral edge of the cut-out portion 14 by means of, for example, Velcro-type fasteners 42. Thus, if the pet becomes agitated and it is feared that he may nip the owner or passersby or if it is desired to ensure that the pet is retained within the interior of the carrier, the meshed portion 32 can be pulled from the storage pocket 34 and securely fastened about the cut-out portion 14.

As can be seen in particular in FIG. 1, a rain shield 44 is further provided in accordance with the present invention and includes first and second shield flaps 46 which are fixedly coupled at the rearward end thereof to the material of the bag-like carrier. Further, a fastener 48 is provided for fastening the two shield flaps 46 together into the position shown in FIG. 1. The rain shield flaps 46 may each include a stiffening fabric substance or a pliable plastic reinforcement(s) 58 (shown in phantom lines) therewithin to ensure that their shape will be retained over time. If the weather is good and/or the rain shield 44 is not desired, the fastener 48 can be unfastened and the rain shield flaps 46 pivoted about the coupling to the bag so as to be disposed interiorly of the pet carrier (see FIG. 2). If desired, a means for fastening the rain shield flaps within the carrier (not shown in particular) can be provided to ensure that they will not obstruct the pet's view or lead to discomfort of the pet within the carrier.

The bottom surface 52 of the bag-like body 12 may be provided with one or more wheels 54 which support the bag when placed on the ground and which allow the owner to pull the bag with the pet therewithin by using the strap handles 26, or in the alternative, by utilizing a pull strap 56 shown in FIG. 1, releasably attached to a loop 58 or the like provided on the forward end of the carrier 10. As shown in FIG. 3, the wheels may be permanently attached to the bottom surface of the bag, the wheel truck 60 therefor itself being fixedly secured to a reinforced portion 62 of the bottom surface 52 of the bag 12. In the alternative, the bottom surface 52 of the bag-like body 12 can be provided with first and second Velcro-type strips 64 or snap fasteners and a wheeled base 66 including four wheel trucks 60 can be provided, separate from the bag and including corresponding, Velcro or snap-like fasteners 68 for fastening to the bottom 52 of the carrier bag. In this manner, when it is desired to pull the pet within the carrier, the wheeled base 66 can be attached to the carrier bottom. On the other hand, if it is known that the pet will not be pulled on the wheels 54 with this embodiment the wheeled base 66 can be detached and left at home and the carrier can be comfortably carried by means of the straps 26 adjacent the owners body without interference from the wheels 54.

In use, the slit is opened by sliding the slide fastener 16 or otherwise unfastening the slit so that the bag can be opened. The pet, such as a small dog or a cat is then placed within the carrier 10 in a lying down position with its head adjacent to or protruding out of the front cut-out opening 14. The collar hook 30 is then secured to the collar or harness of the pet to keep the pet within the bag. The slide fastener 16 or other fastening device is then fastened to close the slit to protect the pet against inclement weather conditions. Further, if desired, the rain shield 44 is pivoted forwardly out through the cut-out portion 14 and the two shield flaps 46 are coupled together by the fastener 48 to define a rain hood type shield for the pet. When it is desired to ensure that the pet stays within the confines of the carrier, the meshed portion 32 is pulled from its storage slot 34 and fastened about the cut-out portion 14 with the Velcro-type fasteners 42, as noted above.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A pet carrier for carrying small pets such as cats or dogs, comprising:
  a sponge rubber padded, free standing bag-like body having an inner surface, an outer surface, and a cut-out portion defined at a forward end thereof, said bag-like body further having a slit opening defined along an upper surface thereof and extending rearwardly from said cut-out portion;
  fastening means for fastening said slit opening to close the same so that an animal can be secured within the bag-like body with its head adjacent the cut-out portion when the slit is closed;

a meshed snout portion mounted to said cut-out portion for defining a mesh covered snout opening; and rain shield means including first and second rain shield flaps each mounted to a side of said slit opening so as to be pivotal from a first position extending forwardly from said cut-out portion to a second position wherein said shield flaps are disposed within the pet carrier, adjacent the interior surface thereof and means for coupling said first and second rain shield flaps in side by side relation when said flaps are in said first position.

2. A carrier as in claim 1, further including wheel means mounted to a bottom surface of said bag-like body.

3. A carrier as in claim 2, wherein said wheel means include wheel trucks fixedly secured to reinforcing members mounted within the material of the bottom surface of said bag-like body.

4. A carrier as in claim 2, further including a pull strap member releasably couplable to a forward end of said carrier.

5. A carrier as in claim 1, further including at least one strap means for carrying said bag-like body.

6. A pet carrier for carrying small pets such as cats or dogs, comprising:

a sponge rubber padded, free standing bag-like body having an inner surface, and outer surface, and a cut-out portion defined at a forward end thereof, said bag-like body further having a slit opening defined along an upper surface thereof and extending rearwardly from said cut-out portion;

fastening means for fastening said slit opening to close the same so that an animal can be secured within the bag-like body with its head adjacent the cut-out portion when the slit is closed;

a meshed snout portion mounted to said cut-out portion for defining a mesh covered snout opening; and a pocket defined within said bag-like body and having an upper opening defined along a lower periphery of said cut-out portion, said meshed snout portion being slidably mounted to said bag-like body so as to be movable from a stored position within said pocket to an operative position wherein the meshed-portion can be coupled to the periphery of said cut-out portion.

7. A pet carrier as in claim 6, further including wheel means mounted to a bottom surface of said bag-like body.

8. A pet carrier as in claim 7, wherein said wheel means include wheel trucks fixedly secured to reinforcing members mounted within the material of the bottom surface of said bag-like body.

9. A pet carrier as in claim 7, wherein said wheel means include four wheel elements fixedly mounted to a substantially planar base member, said substantially planar base member being removably mounted to the bottom surface of said pet carrier.

10. A pet carrier as in claim 9, wherein said base member is removably mounted by means of Velcro-type fasteners to the bottom surface of said bag-like body.

11. A pet carrier as in claim 7, further including a pull strap member releasably couplable to a forward end of said carrier.

12. A pet carrier as in claim 6, further including at least one strap means for carrying said bag-like body.

13. A pet carrier for carrying small pets such as cats or dogs, comprising:

a sponge rubber padded, free standing bag-like body having an inner surface, an outer surface, and a cut-out portion defined at a forward end thereof, said bag-like body further having a slit opening defined along an upper surface thereof and extending rearwardly from said cut-out portion;

fastening means for fastening said slit opening to close the same so that an animal can be secured within the bag-like body with its head adjacent the cut-out portion when the slit is closed;

a meshed snout portion mounted to said cut-out portion for defining a mesh covered snout opening; and wheel means mounted to a bottom surface of said bag-like body, said wheel means including four wheel elements fixedly mounted to a substantially planar base member, said substantially planar base member being removably mounted to the bottom surface of said pet carrier.

14. A carrier as in claim 13, wherein said base member is removably mounted by means of Velcro-type fasteners to the bottom surface of said bag-like body.

15. A pet carrier as in claim 13, further including a pull strap member releasably couplable to a forward end of said carrier.

16. A pet carrier as in claim 13, further including at least one strap means for carrying said bag-like body.

* * * * *